Sept. 6, 1966
J. R. POPE
3,271,580
LOAD SHEDDING APPARATUS
Filed Aug. 15, 1963
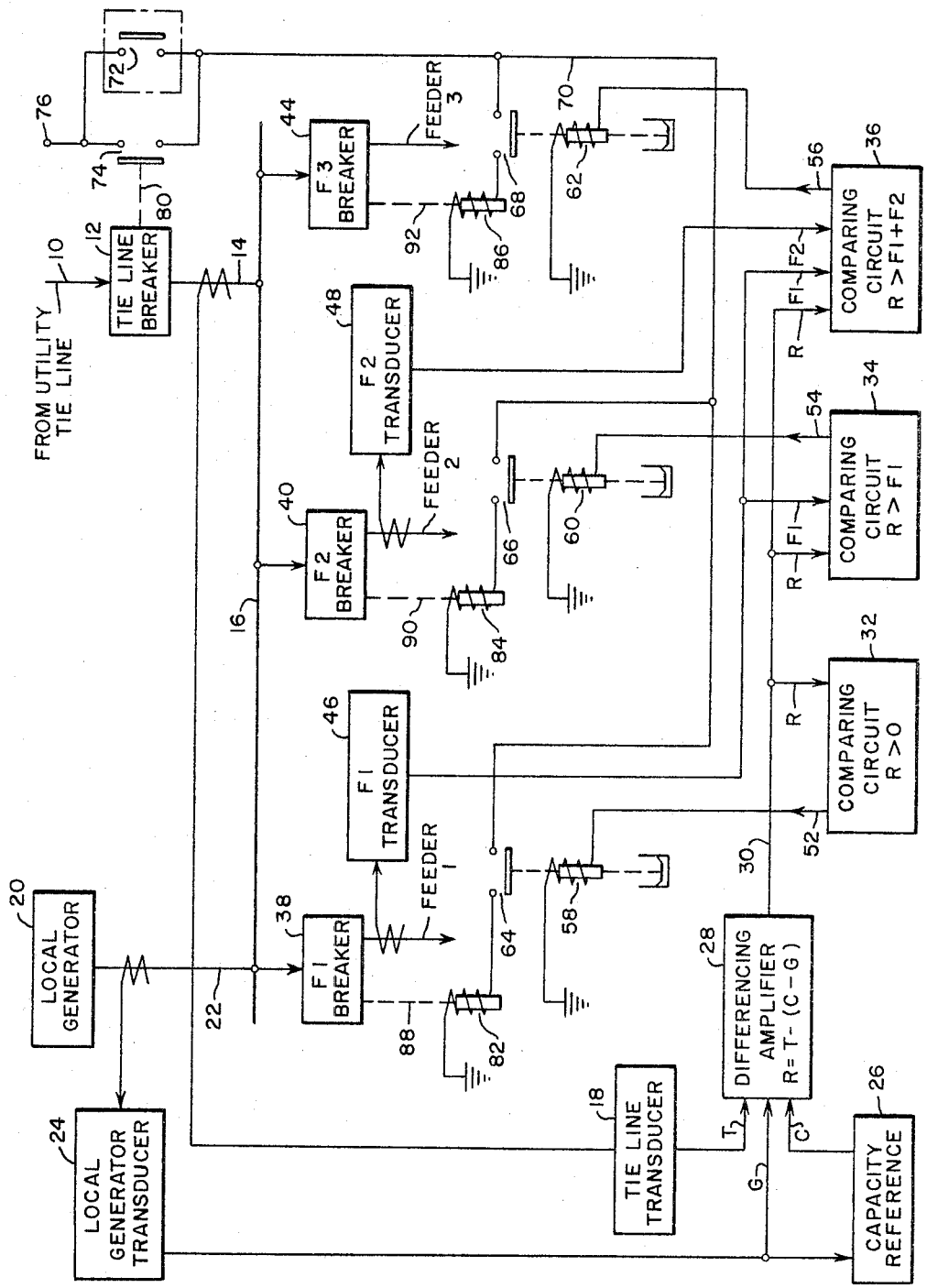
WITNESSES:
Bernard R. Gregory
James T. Young
INVENTOR
Jack R. Pope
BY Bernard Ehli United States Patent Office 3,271,580
Patented Sept. 6, 1966

3,271,580
LOAD SHEDDING APPARATUS
Jack R. Pope, Murrysville, Pa., assignor to Westinghouse Electric Corporation, Pittsburgh, Pa., a corporation of Pennsylvania
Filed Aug. 15, 1963, Ser. No. 302,414
6 Claims. (Cl. 307—29)

The present invention relates to load shedding apparatus, and more particularly to load shedding apparatus for selectively and preferentially dropping loads in case of utility power interruption.

Many municipal and industrial facilities have their own electrical power generating equipment which supplies a portion of their power requirements. When the local generating equipment of the municipal or industrial user is connected in parallel with the power generating equipment of the utility company, it is usually necessary to provide some sort of load dropping or shedding equipment in order to disconnect various feeder lines of the user in case of interruption or failure of power generation from the utility. If such load shedding or dropping equipment were not provided upon failure or interruption of the utility power flow, the local generating equipment would be greatly overloaded. This would cause the local equipment also to fail; thus completely stopping the flow of power to the user, while perhaps also damaging the local generatnig equipment. It would be very advantageous in the local system of the user to selectively and preferentially shed or drop out loads of lesser priority. For example, should a municipality have local generating equipment and there is a utility power failure it would be highly advantageous to permit power to be supplied to hospitals while dropping from the local system residential users. Similarly, in industrial environments, especially when processes such as steel or plastic making are being carried on, it would be advantageous to have lesser priority loads be shed rather than those loads which if dropped would cause great damage to equipment involved in the process. Thus, for example, it would be highly damaging to equipment to have a feeder line drop from the local system which supplies power to equipment rolling hot steel, while there would be little disadvantage to dropping lighting, heating or air conditioning equipment from office facilities. By shedding the lower priority loads, the user can still provide power to higher priority and essential loads up to the generating capacity of the local generating equipment without any interruption of power to the essential loads.

It is, therefore, an object of the present invention to provide new and improved load shedding apparatus.

It is a further object of the present invention to provide new and improved load shedding apparatus capable of dropping only the required amount of load to continue operation in a preferential manner while still providing power to essential loads of a local system.

Broadly, the present invention provides load shedding apparatus in which the required amount of load needed to be dropped from a user's system in case of external power interruption is calculated and trip circuits preset. This is done by comparing the loads being carried by the individual feeder lines of the user's system with the power from a utility and the capability of the user's generation equipment to pick-up additional load. An indication of which loads are to be shed in case of interruption is given and then these loads are shed when a utility power interruption occurs.

These and other objects and advantages of the present invention will become more apparent when considered in view of the following specification and drawing, in which:

The single figure is a schematic-block diagram of the load shedding apparatus of the present invention.

Referring now to the single figure, power is received at the input 10 from the utility tie line supplying the customer. The input 10 leads into a tie line breaker 12, which when closed permits power to pass therethrough into a local system bus 16. If, however, the tie line breaker 12 is opened, no current may pass therethrough. The tie line breaker 12 may be open due to a fault occurring somewhere in the utility system or may be manually opened. To obtain a measure of the power being supplied from the utility tie line, a tie line transducer 18 is provided which is coupled to the input bus 14 of the utility tie line. This coupling may be the usual inductive type. The tie line transducer 18 may be either a watt or current transducer and provides an output signal T which is indicative of the amount of power being supplied by the utility tie line to the local system bus 16. The output T may, for example, be a D.C. analog voltage.

A local generator 20, which is located at the user's facility, and which supplies a portion of his load requirements, supplies power into the local bus 16 through its output bus 22. A measure of the power being supplied by the local generator is provided by a local generator transducer 24, which is coupled to the output bus 22 of the local generator. The local generator transducer 24 may be similar to the tie line transducer 18 and supplies at its output an analog signal G which is indicative of the power being supplied by the local generator 20. A capacity reference 26 is provided to supply an analog reference signal C which is indicative of the generating system capacity based on existing generating conditions. The output of the capacity reference 26 serves to establish the maximum possible power that may be carried by the local generating system, without causing the turbine generator to be tripped out and without damage to the local generating system. The capacity reference is based on boiler and generating equipment and their ability to pick-up additional load.

The three analog signals T, G and C thus provide an indication of the power supplied from the utility tie line, by the local generator and of the capacity of the local generating system. The capacity power C minus the present local generator power G is the amount of power that the local generator could pick-up in case of a tie line failure. If we define the amount of load that must be shed from the local system in case of a utility tie line interruption, as R, this may be related to the other quantities by: $R = T - (C - G)$. R will be sometimes herein referred to as the shedding signal.

The three signals T, G and C are fed into a differencing amplifier 28. The differencing amplifier 28 performs the function to provide at its output 30 the shedding signal R, which is the amount of load that must be dropped if the input tie line power should be interrupted. The shedding signal R from the differencing amplifier 28 is fed into each of three comparing circuits 32, 34 and 36.

In the system as shown, there are three feeder lines, feeders 1, 2 and 3, taken from the local system bus 16. Individual feeder line buses feed into the feeder line breakers, with F1 breaker 38, F2 breaker 40 and F3 breaker 44 being in the feeder lines 1, 2 and 3, respectively. The output from the F1, F2 and F3 breakers in the feeder lines are then connected to various loads within the local system. An F1 transducer 46 is provided to measure and provide a signal of the power supplied to the load in the feeder 1 line. The output of the F1 transducer 46 is an analog signal F1 which is indicative of the magnitude of the power being supplied in the feeder 1. The signal F1 is applied to the comparing circuits 34 and 36. An F2 transducer 48 coupled to the feeder line 2 provides a signal F2 at its output which is indicative of the power being supplied in the feeder 2. The output signal F2 is applied to the comparing circuit 36. Each of the transducers 46 and 48 may be similar to the tie line transducer 18 and the local generator transducer 24 and may be, for example, inductively coupled to the respective feeder lines or to get an indication of the power flow in the particular feeder line associated therewith.

The input then to the comparing circuit 32 is R, to the comparing circuit 34 are R and F1, and to the comparing circuit 36 are R, F1 and F2. Each of the comparing circuits 32, 34 and 36 may be bistable circuits which produce output signals at their respective outputs 52, 54 and 56 when the input signals to the particular element have a given relationship to each other. In the present case, comparing circuit 32 is so designed to give an output signal at the output 52 when there is a need to drop any load, this is determined when R>O, in case of a tie line interruption. The comparing circuit 34 is such that an output signal is provided at the output 54 if the magnitude of R is greater than F1. This shows that if F1 was dropped there would also be a need to drop additional load. The comparing circuit 36 operates such that an output is provided at the output 56 if the magnitude of R is greater than the sum of F1 and F2. This shows that if F1 and F2 were dropped there would also be a need to drop additional load.

Connected to the outputs 52, 54 and 56 are the relay coils 58, 60 and 62, respectively, which have their other ends connected to ground. Thus, if an output signal is provided at 52, 54 and 56, the respective coils 58, 60 and 62 will be energized to perform an indicative function. Associated respectively with each of the coils 58, 60 and 62 are the contacts 64, 66 and 68, which are shown in their open positions, that is, without the relay coils 58, 60 and 64 being energized. When any of the coils 58, 60 or 62 is energized, the respective contacts 64, 66 and 68 will close to provide an indication that the condition demanded by the associated comparing circuit has been met.

One end of the contacts 64, 66 and 68 are commonly connected to the lead 70. The lead 70 is connected to a parallel combination of contacts 72 and 74. The other end of the parallel combination is connected to a voltage source, not shown, applied at the terminal 76. The contact 72 is associated with a reverse power relay which senses a fault occurring somewhere external to the local system, on the utilities tie line at some point outside of the tie line breaker 12. Thus, if a fault should occur somewhere on the tie line outside of the tie line breaker 12, the reverse power relay would sense this and the contacts 72 would close to provide a circuit from the voltage source, through the contact 72, through the lead 70, to the various contacts 64, 66 and 68. The reverse power relay also can close a circuit to interrupt breaker 12. When the reverse power relay operates due to a fault on the utility tie line, the tie line breaker 12 will open to interrupt the flow of tie line power into the local system bus 16, therefore causing a shortage of power on the local bus 16.

The contacts 74 connected in parallel with the contact 72 is an auxiliary set of contacts which serve to show whether the tie line breaker 12 is open or closed. With the tie line breaker 12 in its normally closed position, with power flowing therethrough, the contacts 74 will be in an open position. However, should the tie line breaker 12 be open due to a fault along the utility tie line or due to the manual opening of the tie line breaker the auxiliary contacts 74 would close providing a conductive path between the voltage source and the contacts 64, 66 and 68. The auxiliary contacts 74 are shown with a mechanical connection 80 between the contacts and the tie line breaker 12. The operation of the auxiliary contacts 74 is such that when the contacts are in an open position this indicates the tie line breaker 12 is in a closed position and when the contacts are in a closed position the tie line breaker 12 is in an open position.

The other ends of the contacts 64, 66 and 68 are connected respectively to the trip coils 82, 84 and 86. The other ends of the trip coils 82, 84 and 86 are connected to ground to provide a conductive return path to ground. The trip coil 82 is schematically shown connected through the dotted connection 88 to the F1 breaker 38. If the trip coil 82 is energized, the F1 breaker 38 would open to interrupt power flow in the feeder line 1. The trip coils 84 and 86 are shown schematically connected through the dotted lines 90 and 92, respectively, to the F2 breaker 40 and the F3 breaker 44 respectively. If the breaker trip coil 84 should be energized, the F2 breaker 40 would open and interrupt the flow of power to the feeder 2. If the trip coil 86 should be energized, the F3 breaker 44 would open to interrupt the flow of power to the feeder F3. When any of the breakers 38, 40 or 44 are interrupted, this drops or sheds the associated loads from the local system with the remaining power supplied by the local generator being apportioned to the remaining loads in the local system.

The various loads carried by the feeders 1, 2 and 3, of course, would be so selected that the feeder F1 would be the least critical of the system, i.e., the load carried by this feeder could be dropped from the system with the least overall disadvantage, for example. The next least critical feeder would be that of feeder 2 which would need to be dropped if insufficient capacity remained after the dropping of the feeder 1. The last of the feeders, feeder 3, would be the most critical and would only be dropped if still insufficient capacity remained in the local system. Of course, other feeders would be in an actual system, however, only three are shown here for purposes of clarity and simplicity. In other words, the various feeders are selected preferentially as to which are to be shed in case of a utility tie line failure.

An example may serve to further explain the operation of the present load shedding apparatus. Let us assume first that the state of the system is as shown on the figure. This would mean that the magnitude of the load needed to be shed in case of a tie line interruption is zero, that is, R is zero.

Assume now that under changed conditions, for example, that the various loads being carried by the feeders 1, 2 and 3 are increased so that the shedding signal R, the amount of power necessary to be shed in case of a tie line failure, is greater than zero. This indicates a need to shed load if the tie line opens. Under these conditions the comparing circuit 32 would have an input R and circuit 32 would now switch to provide an output at its terminal 52 which would energize the coil 58 and so set the contact 64 to be in a closed condition. Also assume that the shedding signal R is now greater than the power required to be supplied to the load in feeder 1, such that R is greater than F1. Under these conditions, the comparing circuit 34 would also switch its output state providing an output at 57 to energize the coil 60, which, in turn, would set the contacts 66 to the closed condition. However, assume that the sum of the powers on each of the feeders F1 and F2 is such that F1 plus F2 is smaller than the value R needed to be shed in case of a failure. This indicates if F1 and F2 were dropped no additional load would have to be dropped, in case of a tie line interruption. Under these conditions, the comparing circuit 36 would not change states and would remain such that the coil 62 would not be energized but would remain unenergized with the contacts 68 open.

In the above described example, the contacts 64 and 66 are preset to give an indication of which feeders must be dropped in case of a utility tie line failure or interruption. If an interruption should occur, the feeders 1 and 2 must be dropped from the system so that there will not be an overload on the local generating system. The feeder 3 which carries the most critical load in the local system would still carry power if a tie line interruption should occur.

If an actual failure should occur somewhere in the utility tie line outside of the tie line breaker 12, the contacts 72 of the reverse power line relay, which senses the failure, would close which in turn would trip the tie line breaker 12 to its open state; thus interrupting power from flowing therethrough into the local system bus 16. Without the present load shedding apparatus, the local generator 20 would be greatly overloaded, perhaps causing a general power failure in the local system. However, when the contacts 72 close, a conductive path is provided from the voltage source, through the contacts 72, the lead 70 and through the now closed contacts 64 and 66 to energize the trip coils 82 and 84 of the respective feeders 1 and 2. With the coils 82 and 84 energized, this trips the F1 breaker 38 and the F2 breaker 40 to drop out the feeders 1 and 2, thereby only leaving the feeder 3 in the local system as the only load carrying feeder. Since the contacts 68, associated with the coil 62, are open no conductive path would be provided to energize the trip coil 86; thus, the F3 breaker 44 would remain in its closed state. The coils 58, 60 and 62, however, should have a time delay on pick-up and drop out so as to prevent changing states during faults; thereby ensuring that the breakers selected for tripping will not change during power swings.

If the tie line breaker 12 should be opened for some other reason than the existence of fault on the tie line, the auxiliary contacts 74 would close to provide a conductive path from the reference voltage, through the auxiliary contacts 74, the lead 70 and to the contacts 64, 66 and 68 and would pass through the preset contacts to permit the respective trip coils 82, 84 and 86 to be energized and trip their respective breakers. Thus, the various preset feeders would be dropped from the circuit even if the tie line breaker 12 were open for inspection or by accident without damage to the local generator 20 or without dropping critical loads from the local system.

In summary, the load shedding apparatus operates such that analog signals indicative of the tie line power T being supplied by utility, the magnitude of the power G being generated by a local generator and the power generating capacity C of the local generation are compared according to the equation:

$$R = T - (C - G)$$

This defines the amount of power R that would be necessarily dropped from the local system if an interruption of utility tie line power should occur. This shedding signal R is then compared with signals indicative of the magnitude of load being carried by the various feeder lines of the local system. Comparison is done in a preferential manner so that the load that can best be dropped from the system is preset to be dropped and so on down the line. If the comparing conditions are met, various contacts are preset to indicate which loads are to be dropped in case of a tie line interruption. When a tie line interruption occurs, the already preset contacts provide a conductive path to energize trip coils which in turn trip out the various feeder lines that have been preset to be shed in case of a tie line interruption. Thus, a very fast acting system is provided on the occurrence of an interruption. The feeders that are to be shed have been preset to be shed and there is no delay to gather information as to which feeders are to be shed. Moreover, the system is self-correcting with a continuous presetting operation taking place in response to various load and system changes.

Although the present invention has been described with a certain degree of particularity, it should be understood that the present disclosure has been made only by way of example and that numerous changes in the details of construction and the combination and arrangement of parts and elements may be resorted to without departing from the scope and the spirit of the present invention.

I claim as my invention:

1. In load shedding apparatus for use in a local system receiving energy from a plurality of generating sources and operative to drop circuits from the local system in case of interruption of at least one of the generating sources, the combination of: transducer means for providing supply signals indicative of the power being supplied to the local system; reference means for providing reference signals indicative of the local power supplying capacity; differencing means for receiving said supply and reference signals and providing shedding signals indicative of the amount of load required to be shed in case of interruption of at least one of the generating sources; means for providing load signals indicative of the load being carried by each of a plurality of circuits designated preferentially in the order to be shed in case of interruption of at least one of the generating sources; comparison means to compare said shedding signals with one of said load signals plus the sum of the circuit signals from circuit means of higher preference to be shed in case of interruption of at least one of the generating sources and being operative to provide preset signals; preset means to provide an indication of which circuits are to be shed in case of interruption of at least one of the generating sources in response to said preset signals; and interruption means to drop the indicated circuits from the local system when interruption of at least one of the generating sources occurs.

2. In load shedding apparatus for use in a local system receiving power from external and internal generating sources and operative to drop circuits from the local system in case of interruption of any of the external sources, the combination of: external means for providing external signals indicative of the power being supplied externally; internal means for providing local signals indicative of the power being supplied locally; reference means for providing reference signals indicative of the local power supplying capacity; differencing means for receiving said external, local and reference signals and providing shedding signals indicative of the amount of load required to be shed in case of interruption of the external power being supplied; circuit feeder means for providing circuit signals indicative of the load being carried by each of a plurality of circuits designated preferentially in the order to be shed in case of external power interruption; comparison means to compare said shedding signals with one of said circuit signals plus the sum of the circuit signals of higher preference to be shed in case of external power interruption and being operative to provide preset signals if said shedding signals are of a given relationship to the sum of the circuit signals applied to the respective comparison means; preset means to provide an indication of which circuits are to be shed in case of external power interruption in response to said preset signals; and interruption means to drop the indicated circuits from the local system when an external power interruption occurs.

3. In load shedding apparatus for use in a local system receiving power from external and internal generating sources and operative to drop feeder lines from the local system in case of external power interruption, the combination of: external transducer means for providing external signals indicative of the power being supplied externally; internal means for providing local signals indicative of the power being supplied locally; reference means for providing reference signals indicative of the internal power supplying capacity; differencing means for receiving said external, local and reference signals and providing shedding signals indicative of the amount of load required to be shed in case of external power interruption; feeder means for providing feeder signals indicative of the load being carried by each of a plurality of feeder lines; comparison means associated with each of the feeder lines to compare said shedding signals with selected sums of said feeder signals and being operative to provide preset signals if said shedding signals are of a larger amplitude than the sum of the feeder signals applied to the associated comparison means; preset means to provide an indication of which feeder lines are to be shed in case of external power interruption in response to said preset signals; and interruption means to drop the indicated feeder lines from the local system when external power interruption occurs.

4. In load shedding apparatus for use in a local system receiving power from a plurality of external and internal generating sources and operative to drop feeder lines from the local system in case of external power interruption, the combination of: external means for providing external signals indicative of the power being supplied externally; internal means for providing local signals indicative of the power being supplied locally; reference means for providing reference signals indicative of the local power supplying capacity; differencing means for receiving said external, local and reference signals and providing shedding signals indicative of the amount of load required to be shed in case of external power interruption; feeder means for providing feeder signals indicative of the load being carried by each of a plurality of feeder lines designated preferentially in the order to be shed in case of external power interruption; comparison means associated with each of the feeder lines to compare said shedding signals with the associated feeder signals plus the sum of the feeder signals of higher preference to be shed in case of external power interruption, said comparison means being operative to provide preset signals if said shedding signals are of greater amplitude than the sum of the feeder signals applied to the associated comparison means; preset means to provide an indication of which feeder lines are to be shed in case of external power interruption in response to said preset signals; and interruption means to drop the indicated feeder lines from the local system if an external power interruption occurs.

5. In load shedding apparatus for use in a local system receiving power externally from a utility tie line and internally from a local generator and operative to drop feeder lines from the local system in case of interruption of the utility tie line, the combination of: tie line means for providing tie line signals indicative of the power being supplied externally from the utility tie line; local generator means for providing local signals indicative of the power being supplied locally by the local generator; reference means for providing reference signals indicative of the power supplying capacity of the local generator; differencing means for receiving said tie line, local and reference signals and providing shedding signals indicative of the amount of load required to be shed in case of interruption of the utility tie line power; feeder means for providing feeder signals indicative of the load being carried by each of a plurality of feeder lines designated preferentially in the order to be shed in case of utility tie line interruption; comparison means associated with each of the feeder lines to compare said shedding signals with the associated feeder signals plus the sum of the feeder signals of higher preference to be shed in case of utility tie line interruption, said comparison means being operative to provide preset signals if said shedding signals are a greater magnitude than the sum of the feeder signals applied to the associated comparison means; preset means to provide an indication of which feeder lines are to be shed in case of utility tie line interruption in response to said preset signals; and interruption means to drop the indicated feeder lines from the local system when a utility tie line interruption occurs.

6. In load shedding apparatus for use in a local system receiving power externally from a utility tie line and internally from a local generator and operative to drop feeder lines from the local system in case of interruption of the utility tie line, the combination of: tie line transducer means for providing tie line signals indicative of the power being supplied externally from the utility tie line; local generator transducer means for providing local signals indicative of the power being supplied locally by the local generator; reference means for providing reference signals indicative of the power supplying capacity of the local generator; differencing means for receiving said tie line, local and reference signals and providing shedding signals indicative of the amount of load required to be shed in case of interruption of the utility tie line power; feeder transducer means for providing feeder signals indicative of the load being carried by each of a plurality of feeder lines designated preferentially in the order to be shed in case of utility tie line interruption; comparison means for each of the feeder lines to receive and compare said shedding signals with the feeder signals from the respective feeder line plus the sum of the feeder signals of higher preference to be shed in case of utility tie line interruption, said comparison means being operative to provide preset signals if said shedding signals are a greater magnitude than the sum of the feeder signals applied to the respective comparison means; preset means to provide an indication of which feeder lines are to be shed in case of utility tie line interruption in response to said preset signals; and interruption means to drop the indicated feeder lines from the local system when a utility tie line interruption occurs.

No references cited.

ORIS L. RADER, *Primary Examiner.*

T. J. MADDEN, *Assistant Examiner.*